United States Patent
Piper et al.

(10) Patent No.: US 7,792,885 B2
(45) Date of Patent: Sep. 7, 2010

(54) DATABASE RAM CACHE

(75) Inventors: Richard Matthew Piper, Mattawan, MI (US); Mark Christopher Pilon, Stittsville (CA); Felix M. Landry, Gatineau (CA)

(73) Assignee: Alcatel Lucent, Paris (FR)

( * ) Notice: Subject to any disclaimer, the term of this patent is extended or adjusted under 35 U.S.C. 154(b) by 424 days.

(21) Appl. No.: 11/248,147

(22) Filed: Oct. 13, 2005

(65) Prior Publication Data

US 2006/0085418 A1    Apr. 20, 2006

(30) Foreign Application Priority Data

Oct. 14, 2004    (CA)    ................................ 2484694

(51) Int. Cl.
*G06F 7/00* (2006.01)
*G06F 17/30* (2006.01)

(52) U.S. Cl. .................. 707/999.004; 707/999.2; 707/999.201; 707/600

(58) Field of Classification Search .......... 707/8, 707/102, 103 R, 104, 103; 705/8; 709/108; 711/3, 134; 718/105; 719/315
See application file for complete search history.

(56) References Cited

U.S. PATENT DOCUMENTS

| | | | | | |
|---|---|---|---|---|---|
| 5,107,420 | A | * | 4/1992 | Kametani | 718/106 |
| 5,897,634 | A | * | 4/1999 | Attaluri et al. | 707/8 |
| 6,003,038 | A | * | 12/1999 | Chen | 707/103 R |
| 6,067,547 | A | * | 5/2000 | Douceur | 707/100 |
| 6,216,199 | B1 | * | 4/2001 | DeKoning et al. | 711/3 |
| 6,449,695 | B1 | * | 9/2002 | Bereznyi et al. | 711/134 |
| 6,574,725 | B1 | * | 6/2003 | Kranich et al. | 712/31 |
| 6,631,374 | B1 | * | 10/2003 | Klein et al. | 707/8 |
| 6,996,821 | B1 | * | 2/2006 | Butterworth | 718/100 |
| 7,302,516 | B2 | * | 11/2007 | Hanaki | 711/100 |

(Continued)

FOREIGN PATENT DOCUMENTS

GB    2394816    5/2004

(Continued)

OTHER PUBLICATIONS

Franklin M. et al: "Mid-Tier Caching: The TimesTen Approach", Jun. 4, 2002, pp. 588-593.

(Continued)

*Primary Examiner*—Yicun Wu
*Assistant Examiner*—Yu Zhao
(74) *Attorney, Agent, or Firm*—Kramer & Amado P.C.

(57) ABSTRACT

A system and method are provided for providing a shared RAM cache of a database, accessible by multiple processes. By sharing a single cache rather than local copies of the database, memory is saved and synchronization of data accessed by different processes is assured. Synchronization between the database and the shared cache is assured by using a unidirectional notification mechanism between the database and the shared cache. Client APIs within the processes search the data within the shared cache directly, rather than by making a request to a database server. Therefore server load is not affected by the number of requesting applications and data fetch time is not affected by Inter-Process Communication delay or by additional context switching. A new synchronization scheme allows multiple processes to be used in building and maintaining the cache, greatly reducing start up time.

11 Claims, 7 Drawing Sheets

U.S. PATENT DOCUMENTS

| | | | |
|---|---|---|---|
| 2002/0091702 A1* | 7/2002 | Mullins | 707/100 |
| 2003/0074390 A1* | 4/2003 | Hudson | 709/108 |
| 2004/0025169 A1* | 2/2004 | Wiser et al. | 719/315 |
| 2004/0044861 A1* | 3/2004 | Cavallo et al. | 711/160 |
| 2004/0216103 A1* | 10/2004 | Burky et al. | 718/100 |
| 2004/0254824 A1* | 12/2004 | Loucaides et al. | 705/8 |
| 2006/0064549 A1* | 3/2006 | Wintergerst | 711/134 |

FOREIGN PATENT DOCUMENTS

| | | |
|---|---|---|
| WO | WO 2004/010319 | 1/2004 |

OTHER PUBLICATIONS

"Architected for Real-Time Data Management 1-5- TimesTen's Core In-Memory Database Technology" [Online], Oct. 8, 2003, pp. 1-13.

Sleepycat Software, Inc.: "Berkeley DB", Jun. 14, 2001, chapter 1, section 1-5.

Bornhovd C. et al: Adaptive Database Caching with DBCache IEEE Data Eng. Bull., [Online], vol. 27, No. 2, Jun. 2004, pp. 1-8.

Barrett et al., A Framework for Event-Based Software Integration, ACM Transactions on Software Engineering and Methodology, vol. 5, No. 4, Oct. 1996, pp. 378-421.

European Patent Office, Enterprise Integration Patterns: Designing, Building, and Deploying Messaging, XP-002436299, (Oct. 10, 2003).

David Chappell, Understanding BizTalk Server 2004, BizTalk Server 2004 Technical Article, Feb. 2004, XP-007902439, pp. 4-33.

C. Mohan, Caching Technologies for Web Applications, XP-002242550, pp. 1-31, Sep. 9, 2001.

IBM DB2 Information Integrator, XP007902436, Mai 2004, IBM France, pp. 1-60.

H.V. Jagadish, et al., Dali: A High Performance Main Memory Storage Manager, AT&T Bell Labs, pp. 48-59, XP007902418, (Pub. in 1994).

Lehman, et al., An Evaluation of Starburst's Memory Resident Storage Component, IEEE Transactions on Knowledge and Data Engineering, vol. 4, No. 6, Dec. 1992, XP007902423.

* cited by examiner

DATABASE RAM CACHE

FIELD OF THE INVENTION

The invention relates to database caches, and more particularly to the use of shared caches in multi-threaded processes.

BACKGROUND OF THE INVENTION

In multi-process applications which require access to a shared database, a requesting process requiring database access makes a request to a central memory sharing process, such as a database server. The database server retrieves the required data and copies it to an Inter-Process Communication (IPC) mechanism, from where the requesting process can access the data. However, this requires synchronization between the database server and the requesting processes, which leads to delays and time inefficiencies.

One solution would be to have each requesting process cache its own copy of the database. Although memory intensive, this approach may be feasible for small databases. However for large databases, such as on the order of 4 GB as is typical for network management systems, this approach is clearly not realistic.

SUMMARY OF THE INVENTION

In accordance with one aspect of the invention, a method is provided for providing multiple processes with access to data stored in a database. Data is copied from the database to a cache in shared memory, the shared memory being accessible by each process. Synchronicity between the database and the cache is maintained. Each process is provided with an Application Program Interface (API) containing instructions for accessing the data within the cache.

In accordance with another aspect of the invention, a cache is provided for storing data from a database storing tables. The cache has a data structure which includes, for each table, at least one linked list of data segments storing data from the table. For each table, the data structure includes a control segment storing an address of the first data segment in each linked list. The data structure includes a master segment storing an address for each control segment.

In accordance with yet another aspect of the invention, a method is provided for providing job synchronization. For each job, the job is divided into tasks. The tasks are grouped into one or more task groups, each task group being a single operation for synchronization purposes and comprising at least one of the tasks. Each of the tasks is executed on a worker thread belonging to a specific thread server pool. All waiting client applications are notified of completion of the job only upon completion of the last task of the job.

Apparatus are provided for carrying out the methods of the invention. The methods may be stored in the form of software instructions stored on computer-readable media.

The methods and apparatus of the present invention allow multiple processes to access a common database with minimal memory usage, while also keeping synchronization times to a minimum. By sharing a single cache, memory is saved and synchronization of data accessed by different processes is assured. Synchronization between the database and the shared cache is assured by using a unidirectional notification mechanism between the database and the shared cache. Since the APIs searches the data within the shared cache directly, rather than by making a request to a database server, the server load is not affected by the number of requesting applications, and data fetch time is not affected by Inter-Process Communication delay or by additional context switching. A new synchronization scheme allows multiple processors to be used in building and maintaining the cache, greatly reducing start up time.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
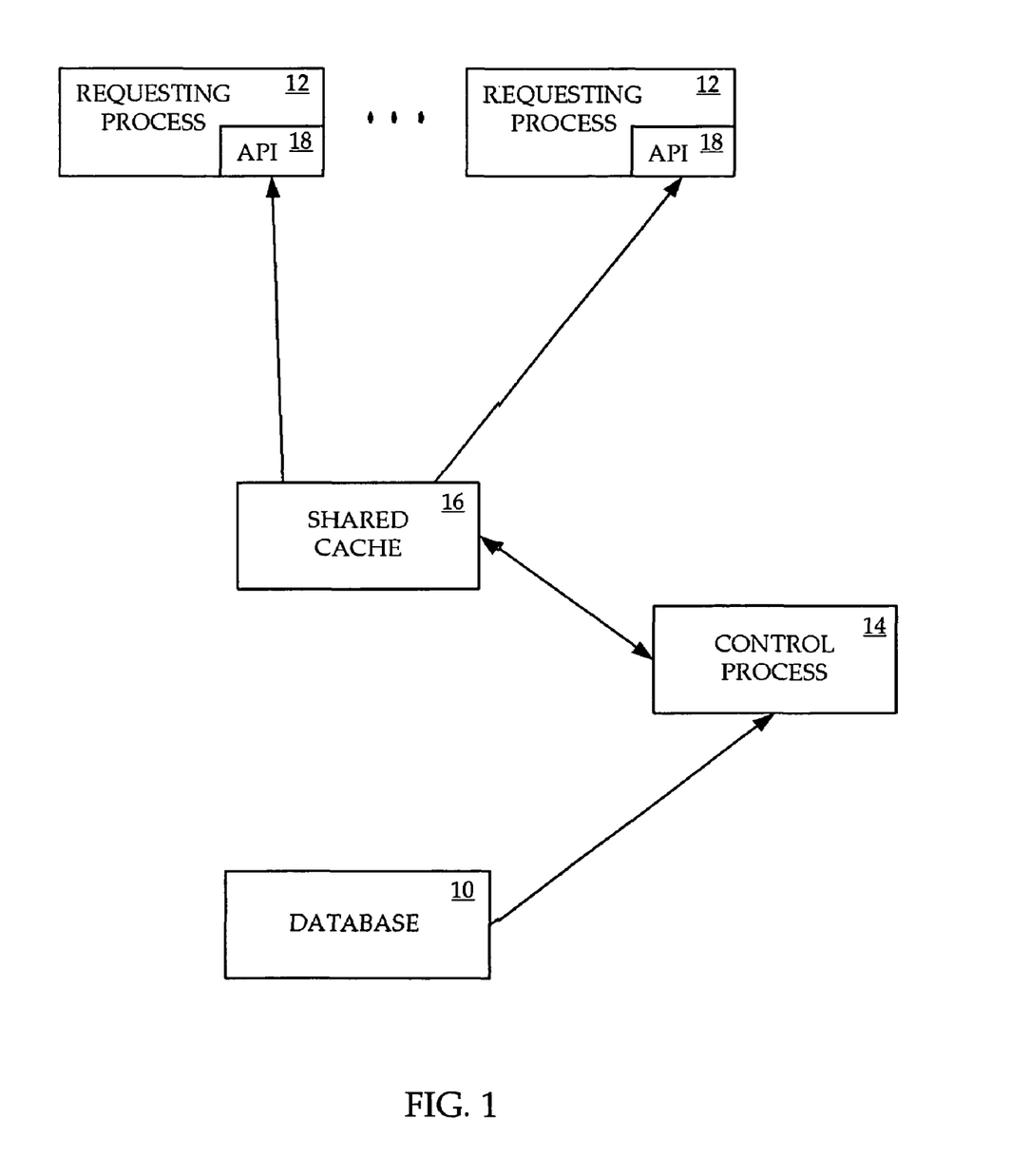
FIG. 1 is a block diagram of a shared RAM cache system according to one embodiment of the invention.

Referring to FIG. 1, an example system of implementing a shared RAM cache according to one embodiment of the invention is shown. A database 10 stores data which is of interest to one or more requesting processes 12. A control process 14 has read-write access to the database 10. The control process 14 also has read-write access to a shared cache 16 stored in RAM. Each requesting process 12 has an API 18, which has read-only access to the shared RAM cache 16. Broadly, in operation the shared cache 16 stores copies of data stored in the database 10, for direct access by each of the requesting processes 12 through their respective APIs 18. Creation of the shared cache 16 and maintenance of the shared cache 16 (synchronization between the shared cache and the database 10) is carried out by the control process 14.

When the control process 14 is first turned on or created, the control process 14 determines whether the shared cache 16 exists. If the shared cache 16 does not exist, the control process 14 creates one or more worker threads, which copy the contents of the database to the shared cache 16. The worker threads preferably use the synchronization scheme described below, in order to accelerate the build time of the shared cache 16.

The shared cache 16 is structured in a way that allows the worker threads to build the shared cache 16 in parallel. The control process 14 creates a master segment within the shared cache 16. The master segment contains a plurality of entries. Each master segment entry stores the location of a different control segment within the shared cache 16, each control segment corresponding to a unique table within the database 10. Each control segment contains at least one entry. Each control segment entry stores the location of a different first data segment, each first data segment corresponding to a unique worker thread. When a worker thread responsible for particular data within a particular table within the database 10 begins copying data from the table to the shared cache 16, the worker thread is therefore able to locate the first data segment to which the data is to be copied. Any first data segment may have as its last entry the address of a second data segment, to which the corresponding worker thread copies data once the first data segment is full. This may be repeated, until a data segment stores an invalid address in its last entry. In effect, each control segment lists the starting address of a linked list of data segments to be filled by a corresponding worker thread with data from the table corresponding to the control segment.

Figure 2:
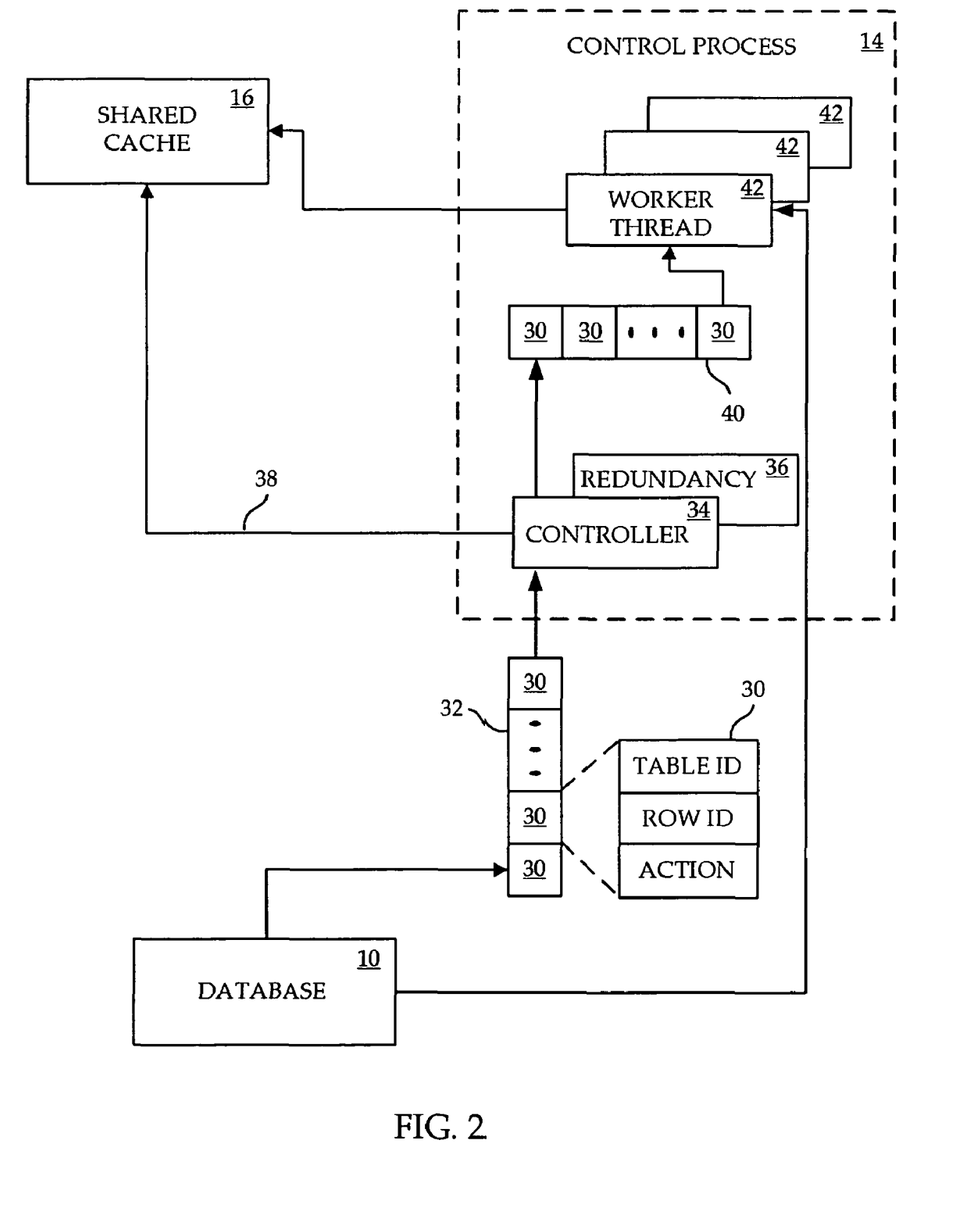
FIG. 2 is a block diagram of messaging during the maintenance of the shared RAM cache of FIG. 1 according to one embodiment of the invention.

Referring to FIG. 2, messaging during synchronization of the database 10 and the shared cache 16 is shown according to one embodiment of the invention. The database server includes a function for initializing an IPC for communicating with the control process 14. Each table within the database 10 includes a trigger. When the contents of a table within the database 10 are altered, by adding a record, deleting a record, or updating a record, the trigger is activated and a stored procedure within the database server of the database 10 is called. The stored procedure creates a message 30, and appends the message 30 to a first queue 32 of messages. The message 30 includes a table identifier (ID), a row ID, and an action. The message is preferably three integers in length, one integer for each of the three fields. The action is a flag signifying one of "addition", "deletion", and "update".

The control process 14 includes a controller 34 and preferably at least one redundancy 36 for the controller 34. If the controller 34 fails, the redundancy 36 takes over the actions of the controller described below. The controller 34 listens to the IPC, created by the database server, for database table updates in the form of messages from the first queue 32. For each message, the controller 34 determines the table ID and the row ID. If the action is a "deletion" or an "update", the controller 34 sets a row status flag 38 to the appropriate table and row within the shared cache 16, thereby locking the row and preventing any of the requesting processes 12 from accessing any record which has just been updated or deleted. The controller 34 then forwards the message to a second queue 40 of messages within the control process 14, and deletes the message from the first queue 32.

Figure 3:
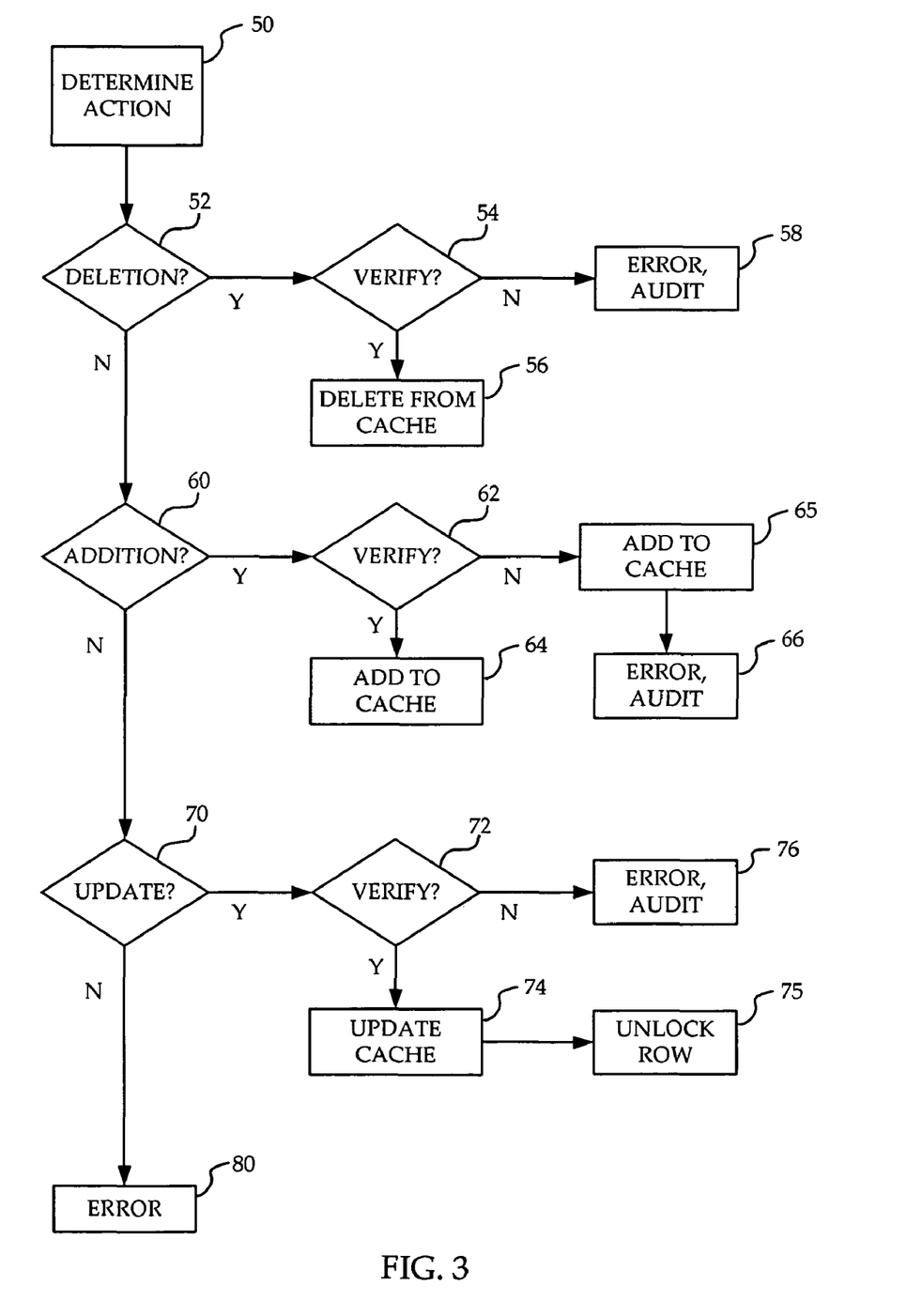
FIG. 3 is a flowchart of a method by which the worker threads of FIG. 2 maintain the shared cache according to one embodiment of the invention.

The control process 14 also includes at least one worker thread 42. The worker threads form a multi-thread process responsible for the actual update of the shared cache 16. Each worker 42 thread reads messages from the second queue 40, using a synchronization scheme described below. Referring to FIG. 3, a flowchart of a method by which a worker thread 42 updates the shared cache 16 according to one embodiment of the invention is shown. The worker thread 42 reads a message from the second queue 40, then at step 50 the worker thread determines the action of the message. If at step 52 the worker thread determines that the action is a "deletion", then at step 54 the worker thread consults the database 10 to verify that the row identified by the row ID and the table ID within the message has actually been deleted from the database. If the deletion is verified, then at step 56 the worker thread deletes the corresponding row from the shared cache 16. If the deletion is not verified at step 54, then at step 58 the worker thread discards the message and creates an error report, and changes the row status flag to a value signifying that the row is to be audited. The row remains accessible to requesting processes, but will be re-examined for possible deletion by an audit portion of the control process (not shown in FIG. 2).

If at step 52 the worker thread determines that the action is not a "deletion", then at step 60 the worker thread determines whether the action is an "addition". If the action is an "addition", then at step 62 the worker thread consults the database 10 to verify that the row identified by the row ID and the table ID within the message has actually been added to the database. If the addition is verified, then at step 64 the worker thread copies the contents of the row within the database 10 to the shared cache 16. If the addition is not verified at step 62, then at step 65 the worker thread copies the contents of the row to the shared cache 16, but discards the message and creates an error report at step 66 and marks the row as to be audited as in step 58.

If at step 60 the worker thread determines that the action is not an "addition", then at step 70 the worker thread determines whether the action is an "update". If the action is an "update", then at step 72 the worker thread consults the database 10 to verify that the row identified by the row ID and the table ID within the message has actually been updated. If the update is verified, then at step 74 the worker thread copies the contents of the row within the database 10 to the shared cache 16 in order to update the shared cache 16. At step 75 the worker thread resets the row status flag to remove the rowlock that had been set by the controller 34. If the update is not verified at step 72, then at step 76 the worker thread discards the message and creates an error report, and marks the row as to be audited as in step 58.

If at step 70 the worker thread determines that the action is not an "update", then the action is of an unknown type. The worker thread generates an error report at step 80, and discards the message.

The shared cache 16 has no equivalent to a database server. Rather, the API 18 within each requesting process 12 accesses data within the shared cache 16 directly. Each API 18 accesses the data in the shared memory segments of the shared cache 16 through the master segment and does not directly interact with the server process. If the row status flag of a row being accessed by an API 18 is marked as update pending or deletion pending, the API 18 does not retrieve the data for the row. Synchronization is thereby achieved by use of row status flags, set by the controller 34 (or the redundancy 36) when a row is being updated or deleted and by the worker threads 42 once the update or deletion is verified.

Figure 4:
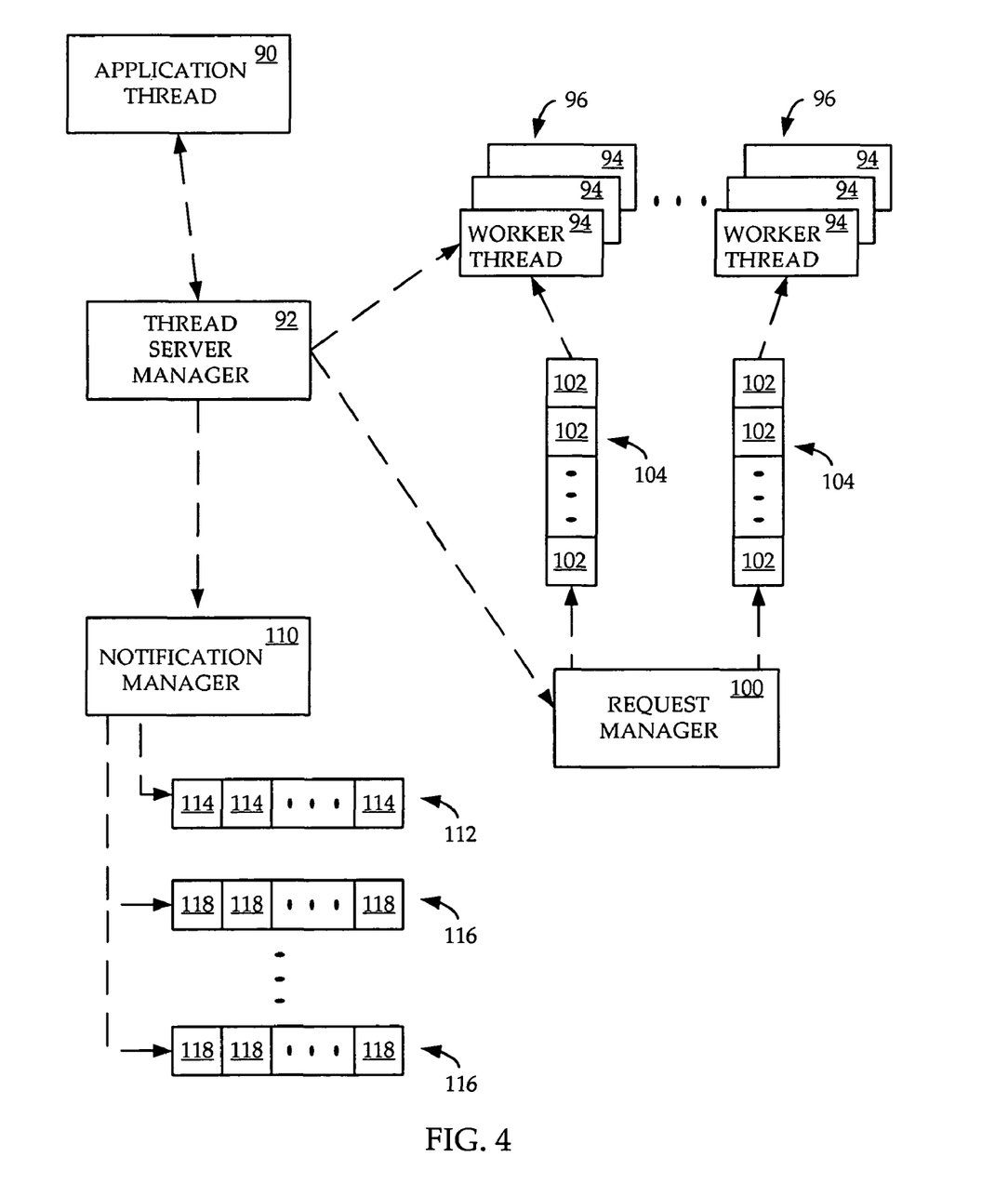
FIG. 4 is a block diagram of objects used for synchronizing requests according to one embodiment of the invention.

In order to accelerate creation and maintenance of the shared cache by the worker threads, a synchronization schemed described with reference to FIG. 4 to FIG. 7 is used. Referring to FIG. 4, a block diagram of objects used for synchronizing requests according to one embodiment of the invention is shown. An application thread 90 communicates with a thread server manager 92. The application thread 90 sends requests for notification groups and task requests to the thread server manager 92. In the case of building and maintaining the shared cache 16, the application thread would be an application within the control process 14, such as the controller 34. The thread server manager 92 is responsible for creating and destroying one or more worker threads 94, which may be grouped into one or more worker thread groups 96. The thread server manager 92 also serves as the worker server main command loop. Although only one application thread 90 is shown in FIG. 4, it is to be understood that there will generally be more than one application thread 90 requesting task requests and notification groups.

The thread server manager 92 sends requests for task requests to a request manager 100. The request manager 100 creates task requests 102, which are sent to the worker threads 94 on internal request manager queues 104, one request manager queue 104 per worker thread group 96. The worker threads 94 continuously attempt to read task requests 102 from the corresponding request manager queue for execution, access to each request manager queue 104 being restricted by use of counting semaphores to prevent access when the request manager queue is empty.

The thread server manager 92 also sends requests for notification groups (described in more detail below) to a notification manager 110. The notification manager 110 is responsible for task synchronization, and creates and deletes notification groups. The notification manager 110 stores a global list 112 of all open and/or executing notification group objects 114 which it has created. The notification manager 110 also stores one or more thread specific lists 116 of handles 118 to the notification group objects 114. Each thread specific list 116 lists handles 118 to notification group objects for a particular application thread.

Figure 5:
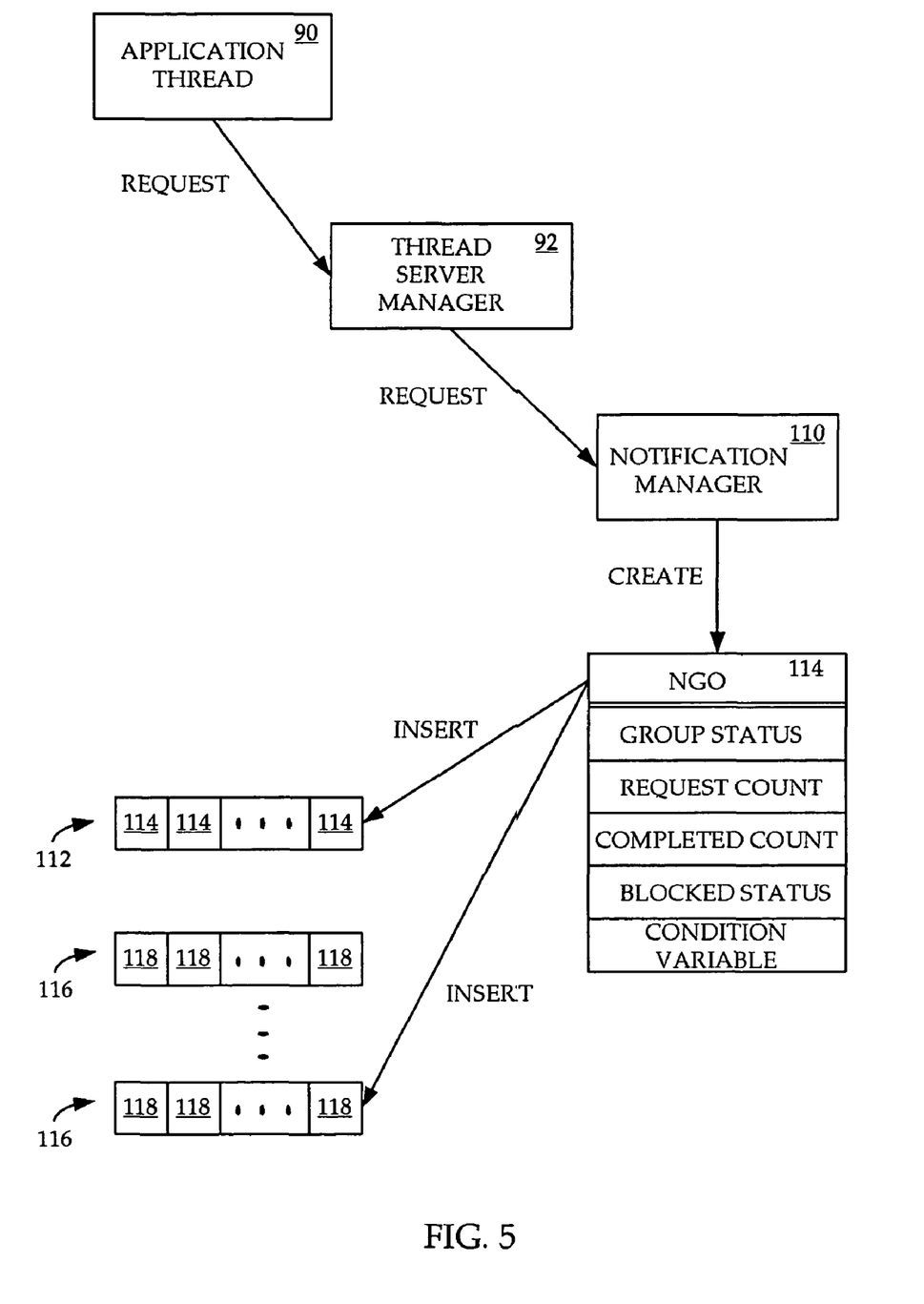
FIG. 5 is a block diagram of messaging during creation of a notification group.

Referring to FIG. 5, a block diagram of messaging when requesting a notification group according to one embodiment of the invention is shown. The application thread 90 sends a request for a notification group to the thread sever manager 92. The thread server manager 92 forwards the request to the notification manager 110. In response to the request, the notification manager 110 creates a notification group object (NGO) 114. The NGO 114 allows the application thread 90 to be informed when all the tasks that the application thread 90 has requested (between creation of the NGO and the NGO being set to inactive) have been completed. The NGO is an object-oriented programming object, and includes as values a group status, a request count, a completed request count, a blocked status, and a condition variable used for blocking application threads.

The group status has a value of 'active' if the notification group is still accepting requests, and the group can not complete until the group status is set to 'inactive'. The group status is set to 'inactive' when the application thread 90 closes the group via the handle of the NGO. When the NGO 114 is first created, the group status is set to 'active'.

The request count is a count of the number of requests that have been added to the group since the NGO was created. The initial value of the request count is '0'. The completed request count is a count of the number of requests that have been added to the group and that have been completed. The initial value of the completed request count is '0'.

The blocked status is used to bypass the condition wait if the notification group does not currently warrant being blocked. This may arise only if the group status is set to 'inactive', and either no requests have been made to the group or all requests have been completed. The initial value of the blocked status is 'blocked'. The blocking condition variable is used in a condition wait call. The blocking condition variable will block all threads that perform a condition wait on the variable. This block will continue until a signal or a broadcast is performed on the variable. A blocked status of 'blocked' signifies that the group has not completed, and any thread that blocks on this group will not bypass the condition variable block. Once a thread reaches the condition variable, it is blocked until it receives a continue signal from another thread. The block status also acts as a guard that will not allow the thread to continue, even if released by signal, until the blocking status is 'unblocked'. This prevents inadvertent release of the condition variable. However, once the group status is closed and the number of completed requests equals the number of sent requests (the request count equals the completed request count), it should be impossible to reach a blocked state. Under these conditions the blocked status prevents the thread from blocking on the condition variable and never being woken up.

More particularly, an application thread makes a call to wait until a specific NGO completes. If the NGO has not already completed then the internal routine in the NGO calls a function pthread_cond_wait( ), passing in the address of the condition variable that exists within the NGO. This effectively blocks the execution of the application thread until another thread calls the function pthread_cond_signal( ), which releases a single application thread that is blocked on the argument condition variable, or the function pthread_condition broadcast( ), which releases all application threads blocked on the argument condition variable. Both pthread_cond_signal( ) and pthread_cond_broadcast( ) are atomic operations and do not affect the functionality of subsequent calls to pthread_cond_wait( ) using the same argument variable.

Since a thread should not be blocked on a group that has already completed, the blocked flag variable is used to bypass the call to pthread_cond_wait( ) during the time that an NGO has completed but has not yet been destroyed. Once the number of completed requests equals the number of requests made and the NGO status is 'inactive', the blocked flag is set to 'unblocked' and a call is made to pthread_cond_broadcast( ) using the condition variable of the NGO to free up any threads that are blocked on the NGO.

Once the notification manager 110 has created the NGO 114, the notification manager inserts the NGO 114 into the global list 112. The notification manager also copies a handle to the NGO 114 and places the handle in the thread specific list 116 corresponding to the application thread 90. The handle entry can then only be removed by the application thread 90 calling to close the NGO 114. No other thread can add requests to or close the NGO.

Figure 6:
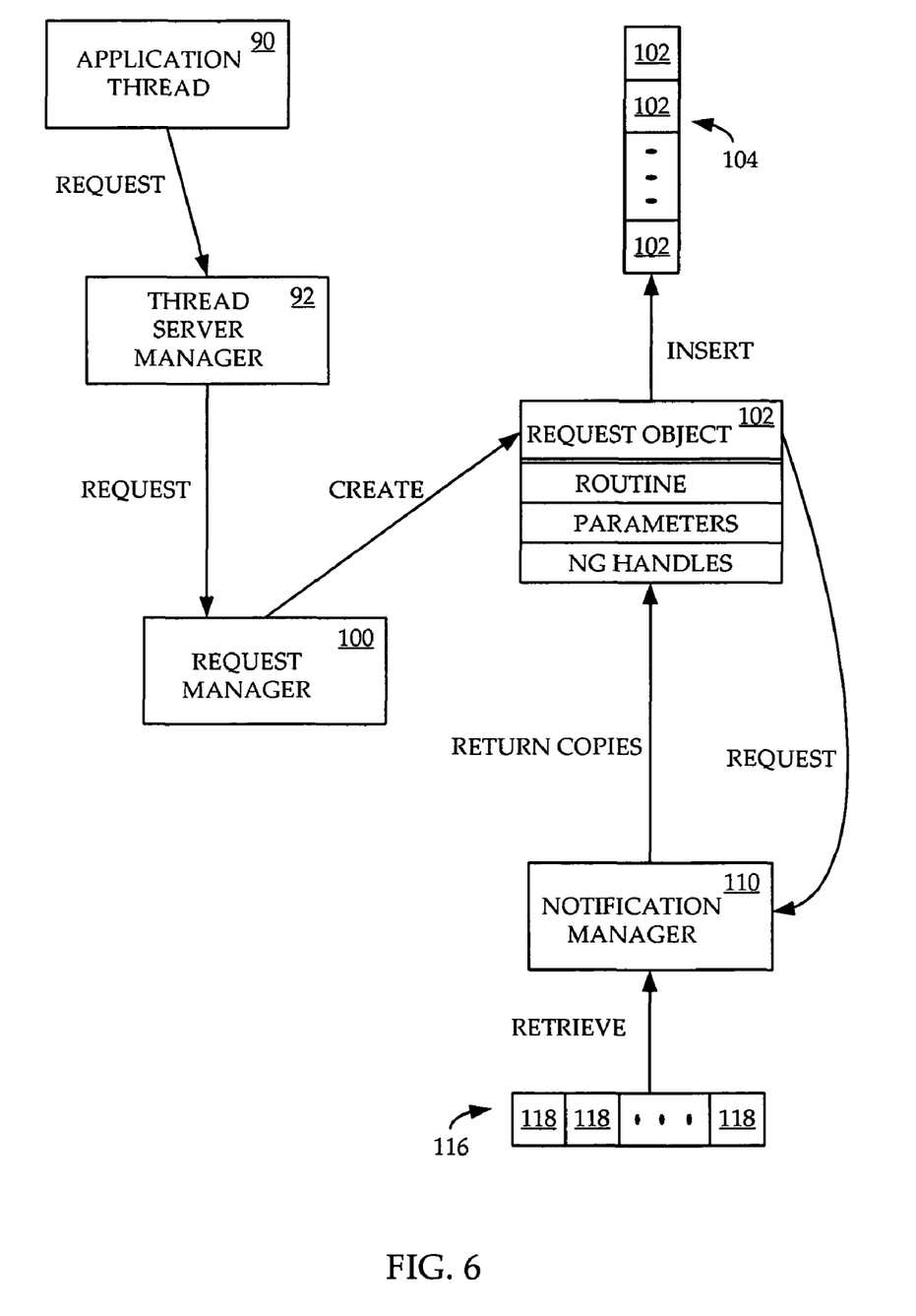
FIG. 6 is a block diagram of messaging during creation of a request.

Referring to FIG. 6, a block diagram of messaging when requesting a task according to one embodiment of the invention is shown. The application thread 90 sends a request for a task to the thread sever manager 92. The request for a task includes an address of a client-defined procedure and an address of any parameters required by the client-defined procedure. The thread server manager 92 forwards the request to the request manager 100. In response to the request, the request manager 110 creates a new request object 102. Upon creation, the request object 102 calls the notification manager 110, which increments the request count of the open NGOs 114 identified by the handles 118 within the thread specific list 116 corresponding to the application thread 90. The notification manager 110 returns a copy of the list of handles to open NGOs in the thread specific list 116 of the application thread 90 to the newly created request object 102.

In addition to the list of handles to open NGOs, the request object 102 also includes the address of the client-defined routine that is to be executed by a worker thread, and the address of arguments used by the routine. The request manager 100 then inserts the request object 102 into a request manager queue 104 corresponding to the worker thread group associated with the application thread, and increments the semaphore of the request manager queue.

Figure 7:
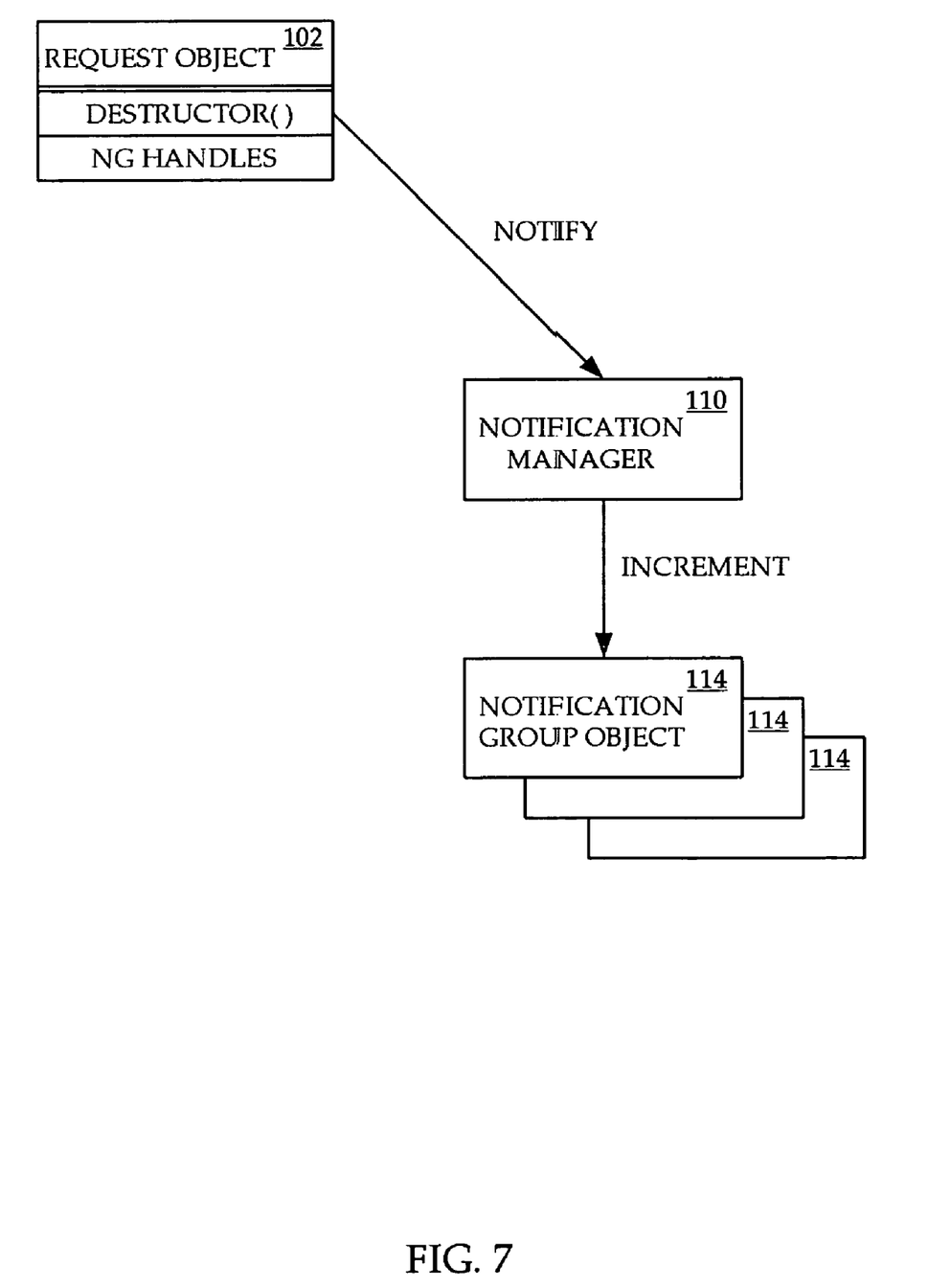
FIG. 7 is a block diagram of messaging when a request is completed.

Referring to FIG. 7, a block diagram of messaging when a task completes according to one embodiment of the invention is shown. When a task completes, the request manager 100 deletes the request object 102 which contained the task (or more precisely, contained the address of the routine that was to be executed) terminates. The destructor function of the request object 102 notifies the notification manager 110 that the task request has been completed and provides the notification manager with the list of handles of open NGOs. The notification manager 110 then increments the completed request count in each of the NGOs having handles in the list provided by the request object 102. Since the list of handles contained in the request object 102 is a copy of the list of handles that existed at the time the request object was created, any NGOs created after the request object was created will not have their completed request count incremented.

If after incrementing the completed request count of an NGO the incremented request count equals the request count, the NGO may be deleted by the notification manager. The NGO is deleted if no threads are blocked on the NGO, the NGO has a status of 'inactive', and the number of completed requests equals the number of requests. Once these conditions are met, the NGO will be deleted by the thread that caused the conditions to be met.

In the preferred embodiment, the control process 14, the at least one API 18, and the triggered functions of the database and are in the form of software within a processor, but may more generally be in the form of any combination of software or hardware, including hardware within an integrated circuit. The processor need not be a single device, but rather the instructions could be located in more than one device.

The invention has been described using a particular task synchronization scheme. The invention can be use other synchronization schemes while still realizing the benefit of reduced memory usage and faster fetch times, but building of the cache will be slower.

The synchronization scheme of the invention has been described as being used within the control process during building of the cache. The synchronization scheme can also be used by worker threads during maintenance of the cache, or even by multi-thread processes within the requesting processes. In fact, any multi-thread process can benefit from the faster execution time provided by the synchronization scheme described herein.

The embodiments presented are exemplary only and persons skilled in the art would appreciate that variations to the embodiments described above may be made without departing from the spirit of the invention. Methods that are logically equivalent or similar to the method described above with reference to FIG. 3 may be used to implement the methods of the invention. The scope of the invention is solely defined by the appended claims.

We claim:

1. A method of providing a plurality of processes with access to data stored in a cache, comprising:

copying the data from a database to the cache in a shared memory, the shared memory being directly accessible by each process of the plurality of processes without using a database server;

maintaining synchronicity between the database and the cache, wherein any alteration of the database triggers creation of a message comprising a table identifier (ID) of a table within the database, a row ID, and an action flag, wherein the action flag signifies one of addition, deletion, and update in the database;

when the action flag signifies either deletion or update, setting a row status flag to the table ID and the row ID that correspond to the action flag in the cache as update pending or deletion pending;

modifying the cache in response to the message, wherein the action flag specifies the modification performed in a row identified by the table ID and row ID;

providing each process with an Application Program Interface (API) that allows each process to access the data within the cache; and preventing said API from accessing said data from within the cache when the row status flag of an accessed row is marked as update pending or deletion pending.

2. The method of claim 1, further comprising:

using a plurality of worker threads to copy the data from the database to the cache, wherein the cache comprises: for each table in the database, at least one linked list of data segments storing data from the table, a plurality of control segments in the cache, wherein each control segment stores an address of a different first data segment in each linked list, and each data segment corresponds to a unique worker thread, whereby the worker thread corresponding to a second data segment copies data from the database into the second data segment in the cache once the first data segment is full, except that a last entry in a last data segment in the linked list of data segments stores an invalid address, and a master segment containing a plurality of entries within the cache, wherein each master segment entry stores an address for a different control segment.

3. The method of claim 1, further comprising:

rowlocking a portion of the data in the cache when a corresponding row and table in the database is deleted or modified until the deletion or modification in the database is verified, thereby preventing the processes from accessing the portion of the data while deletions or modifications in the database are being synchronized with the cache.

4. The method of claim 1, further comprising:

creating at least one worker thread, each worker thread assigned a task of modifying a portion of the cache;

creating a notification group object (NGO);

upon completion of each worker thread of its assigned task, destroying the NGO; and upon destruction of the NGO, removing any rowlock for the portion of the cache identified by the message.

5. A cache that stores data from a database having a plurality of tables, the cache having a data structure stored on a computer-readable medium, wherein the computer-readable medium is a shared memory that is directly accessible by a plurality of processes without using a database server, the data structure comprising:

for each table of the plurality of tables, at least one linked list of data segments storing data from the table, wherein each first data segment corresponds to a unique worker thread and has an address of a second data segment as its last entry, whereby the worker thread corresponding to the second data segment copies the data from the database to the second data segment in the cache once the first data segment is full, except that a last entry in a last data segment in the linked list of data segments stores an invalid address, wherein any alteration of the database triggers creation of a message comprising a table identifier (ID) of a table within the database, a row ID, and an action flag, wherein the action flag signifies one of addition, deletion, and update in the database;

a plurality of control segments, wherein each control segment stores an address of a different first data segment in each linked list of data segments;

a master segment containing a plurality of entries, wherein each master segment entry stores an address for a different control segment; and row status flags that block access to data in the cache in a specified row of each table when said row status flags are marked as update pending or deletion pending, wherein the row status flags are set to corresponding table IDs and row IDs in the cache as update pending or deletion pending when the action flag signifies either deletion or update.

6. The method of claim 1, wherein the message is three integers in length, each integer respectively corresponding to the table ID, the row ID, and the action flag.

7. The method of claim 1, wherein a controller sets the row status flag, deletes the message from a first queue, and forwards the message to a second queue.

8. The method of claim 1, further comprising:
    determining that an action in the database is neither deletion, addition, nor update; and
    in response to the determination, discarding the message and generating an error report.

9. The method of claim 4, wherein the NGO is an object oriented programming object.

10. The method of claim 4, wherein the NGO comprises at least one of a group status, a request count, a completed request count, a blocked status, and a condition variable.

11. A method of providing a plurality of processes with access to data stored in a cache, comprising:
    copying the data from a database to the cache in a shared memory, the shared memory being directly accessible by each process of the plurality of processes without using a database server;
    maintaining synchronicity between the database and the cache, wherein any alteration of the database triggers creation of a message comprising a table identifier (ID) of a table within the database, a row ID, and an action flag, wherein the action flag signifies one of addition, deletion, and update in the database;
    when the action flag signifies either deletion or update, setting a row status flag to the table ID and the row ID that correspond to the action flag in the cache as update pending or deletion pending;
    modifying the cache in response to the message, wherein the action flag specifies the modification performed in a row identified by the table ID and row ID;
    providing each process with an Application Program Interface (API) that allows each process to access the data within the cache;
    preventing said API from accessing said data from within the cache when the row status flag of an accessed row is marked as update pending or deletion pending;
    determining that an action in the database is neither deletion, addition, nor update; and in response to the determination, discarding the message and generating an error report; and
    using a plurality of worker threads to copy the data from the database to the cache, wherein the cache comprises: for each table in the database, at least one linked list of data segments storing data from the table, a plurality of control segments in the cache, wherein each control segment stores an address of a different first data segment in each linked list, and each data segment corresponds to a unique worker thread, whereby the worker thread corresponding to a second data segment copies data from the database into the second data segment in the cache once the first data segment is full, except that a last entry in a last data segment in the linked list of data segments stores an invalid address, and a master segment containing a plurality of entries within the cache, wherein each master segment entry stores an address for a different control segment, the message is three integers in length, each integer respectively corresponding to the table ID, the row ID, and the action flag, a controller sets the row status flag, deletes the message from a first queue, and forwards the message to a second queue

* * * * *